US012632308B2

(12) United States Patent
Lee et al.

(10) Patent No.: US 12,632,308 B2
(45) Date of Patent: May 19, 2026

(54) AUGMENTED REALITY / VIRTUAL REALITY (AR/VR) SYSTEM INTEGRATION WITH POWER AND PERFORMANCE MANAGEMENT

(71) Applicant: Meta Platforms Technologies, LLC, Menlo Park, CA (US)

(72) Inventors: Robert Sungmin Lee, Renton, WA (US); Yifei Li, Sammamish, WA (US); Micah Zev Brodsky, Menlo Park, CA (US); Bardia Zandian, Redwood City, CA (US); Yie Jia, Winter Springs, FL (US); Srikanth Nori, Arlington, MA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 359 days.

(21) Appl. No.: 18/455,393

(22) Filed: Aug. 24, 2023

(65) Prior Publication Data

US 2025/0068474 A1 Feb. 27, 2025

(51) Int. Cl.
*G06F 9/50* (2006.01)

(52) U.S. Cl.
CPC .......... *G06F 9/5038* (2013.01); *G06F 9/5094* (2013.01)

(58) Field of Classification Search
None
See application file for complete search history.

(56) References Cited

U.S. PATENT DOCUMENTS 9,395,786 B2    7/2016  Talwar et al.
9,807,291 B1 *  10/2017  Tome ................... H04N 23/951
(Continued)

FOREIGN PATENT DOCUMENTS

GB          2565302 A  *  2/2019  ............. G06F 3/013
WO    WO-2018106735 A1 *  6/2018  ............. G06F 3/012
WO    WO-2019231108 A1 * 12/2019  ............... G06F 3/14

OTHER PUBLICATIONS

USDA. "Augmented Reality and Virtual Reality Medical Devices." (Jul. 13, 2022). Retrieved online Dec. 8, 2025. https://www.fda.gov/media/159709/download (Year: 2022).*
(Continued)

*Primary Examiner* — James A Reagan
(74) *Attorney, Agent, or Firm* — Morgan, Lewis & Bockius LLP

(57) ABSTRACT

Adaptive cross-layer power, thermal, and performance management within augmented and/or virtual reality (AR/VR) display devices is described. AR/VR experiences use extensive system resources to provide high quality user experience (UX). Application performance modes (e.g., Application Resource Bundles "ARBs") may be registered and for each mode, applications may request specific performance from the underlying hardware/firmware/software subsystems. As system state changes, a central service may periodically reconfigure power states of individual subsystems resulting in power, thermal, and performance tradeoffs. As the power states are reconfigured, the central service may change the application performance modes to allow applications to adapt their UX to the new system state allowing applications to build custom behaviors and provide enhanced UX over a variety of states.

20 Claims, 10 Drawing Sheets

(56) References Cited

U.S. PATENT DOCUMENTS

| | | | | |
|---|---|---|---|---|
| 9,952,652 | B2 * | 4/2018 | Chang | G06F 1/3209 |
| 10,509,466 | B1 * | 12/2019 | Miller | H04N 23/57 |
| 11,126,283 | B2 * | 9/2021 | Chen | G06F 3/0416 |
| 11,256,319 | B2 * | 2/2022 | Yardi | G06F 3/013 |
| 11,580,935 | B2 * | 2/2023 | Griswold | G06T 19/006 |
| 2016/0203359 | A1 * | 7/2016 | von und zu Liechtenstein | |
| | | | | G06V 40/19 |
| | | | | 345/156 |
| 2016/0379408 | A1 * | 12/2016 | Wright | G02B 27/0172 |
| | | | | 345/633 |
| 2017/0228938 | A1 * | 8/2017 | Fateh | G06F 3/045 |
| 2018/0061128 | A1 * | 3/2018 | Cabanier | G02B 27/017 |
| 2018/0157315 | A1 | 6/2018 | Ehsan et al. | |
| 2018/0288354 | A1 * | 10/2018 | Anderson | G06T 11/60 |
| 2019/0101977 | A1 * | 4/2019 | Armstrong-Muntner | |
| | | | | G06N 20/00 |
| 2019/0371259 | A1 * | 12/2019 | Sharma | G06F 3/04847 |
| 2020/0387245 | A1 * | 12/2020 | Chen | G06F 3/0202 |
| 2021/0089117 | A1 * | 3/2021 | Bodolec | G06F 3/013 |
| 2021/0201580 | A1 * | 7/2021 | Sztuk | G06T 5/70 |
| 2021/0312887 | A1 * | 10/2021 | Griswold | G06T 19/006 |
| 2022/0013084 | A1 * | 1/2022 | Griswold | G06T 19/00 |
| 2022/0365348 | A1 * | 11/2022 | Hanumante | G06F 1/26 |
| 2023/0185603 | A1 * | 6/2023 | Gayen | G06F 9/4881 |
| | | | | 718/107 |
| 2023/0368325 | A1 * | 11/2023 | Kemisetti | G06F 1/3287 |
| 2024/0036999 | A1 * | 2/2024 | Aurongzeb | G06F 9/5055 |
| 2024/0290299 | A1 * | 8/2024 | Griswold | G06T 19/006 |
| 2024/0378054 | A1 * | 11/2024 | Berson | G06F 11/3466 |
| 2025/0068474 | A1 * | 2/2025 | Lee | G06F 1/163 |
| 2025/0278314 | A1 * | 9/2025 | Paul | G06F 1/3206 |

OTHER PUBLICATIONS

Aya Taghian et al. "Virtual, Augmented Reality, and Wearable Devices for Biomedical Applications: A Review." (Dec. 2021). Retrieved online Dec. 8, 2025. https://www.researchgate.net/publication/363130024_Virtual_Augmented_Reality_and_Wearable_Devices_for_Biomedical_Applications_A_Review (Year: 2021).*

Lin Lu et al. "Wearable Health Devices in Health Care: Narrative Systematic Review." (Nov. 9, 2020). Retrieved online Dec. 8, 2025. https://pmc.ncbi.nlm.nih.gov/articles/PMC7683248/ (Year: 2020).*

* cited by examiner

200A

200

200C

LEFT SIDE
227

BODY
220

HEAD
STRAP
230

DISPLAY
210

FRONT SIDE
225

BOTTOM SIDE
223

DISPLAY
210

FRAME
305

300

DISPLAY
310

400

500

<u>700</u>

800

REGISTER APPLICATION PERFORMANCE MODES
802

RECEIVE SYSTEM HEALTH INFORMATION
804

DETERMINE SERVICE RESOURCES / SERVICE
RESOURCE LEVELS REACTIVELY / PROACTIVELY
806

ADJUST PERFORMANCE MODES BASED ON
AVAILABLE SERVICE RESOURCES / RESOURCE
LEVELS
808

AUGMENTED REALITY / VIRTUAL REALITY (AR/VR) SYSTEM INTEGRATION WITH POWER AND PERFORMANCE MANAGEMENT

TECHNICAL FIELD

This patent application relates generally to augmented and/or virtual reality (AR/VR) presentation in near-eye display devices, and in particular, to coordinated management of AR/VR applications and resources from power, thermal, and performance perspectives.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

To facilitate delivery of this and other related content, service providers have endeavored to provide various forms of wearable display systems. One such example may be a head-mounted display (HMD) device, such as a wearable eyewear, a wearable headset, or eyeglasses. In some examples, the head-mounted display (HMD) device may project or direct light to may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment. Head-mounted display (HMD) devices may also present interactive content, where a user's (wearer's) gaze may be used as input for the interactive content. Such devices, however, present novel challenges in power, performance and thermal management.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1:
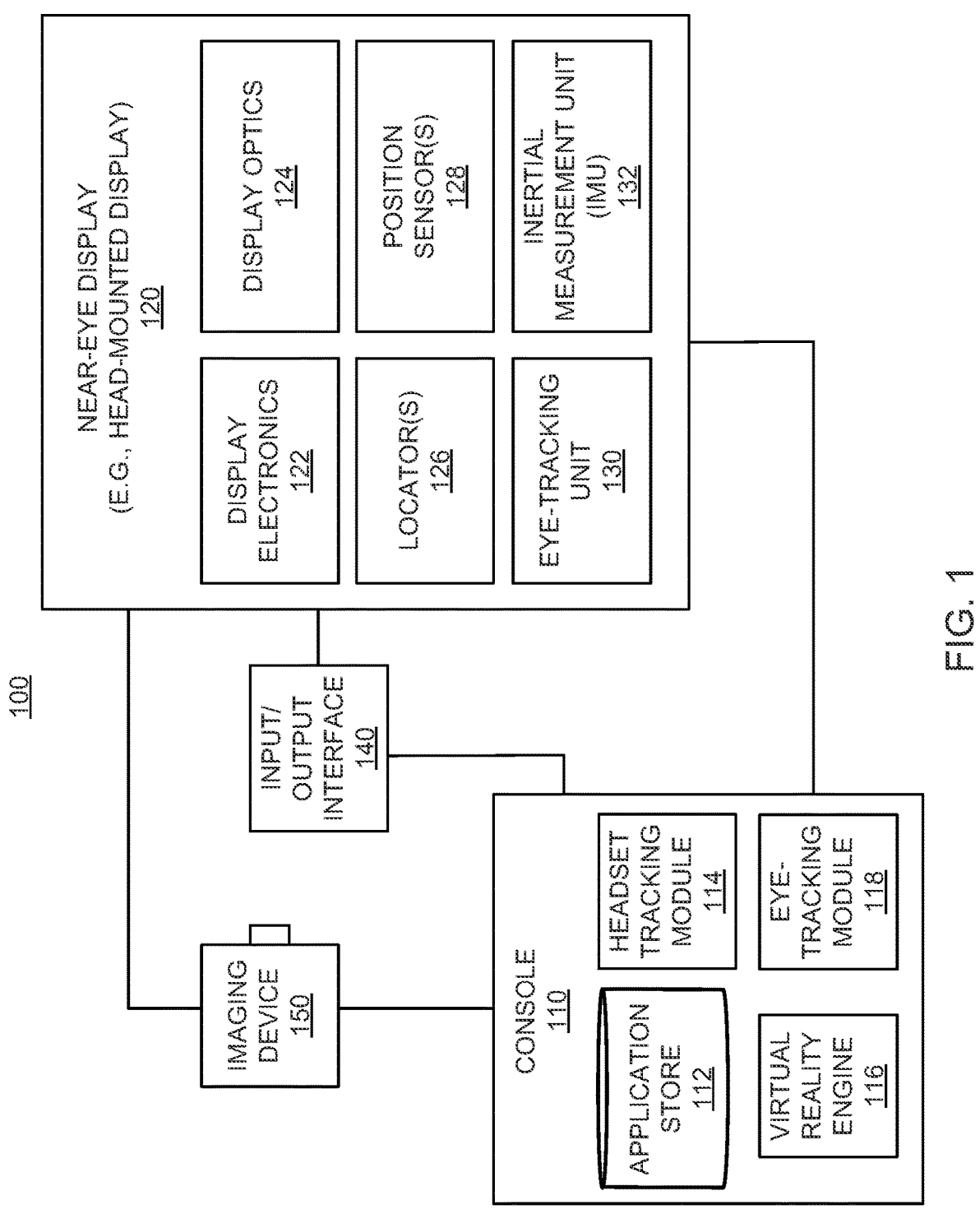
FIG. 1 illustrates a block diagram of an artificial reality system environment including a near-eye display, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

AR/VR wearable devices are associated with challenges in power, performance, and thermal management. Traditional smartphone/mobile device power-management techniques do not provide a path to achieving all-day battery life and comfortable thermals due to multiple challenges: the AR/VR wearable devices have a novel form-factor (light, wearable multi-device configuration with small batteries), high performance demands (high framerate displays, a wide array of sensors), high power consumption (due to waveguide optics, projectors, cameras and other sensors, accelerators etc), heavy usage (all-day intermittent usage both indoor and outdoor, with few options for charging) and novel developer patterns (heavy reliance on multi-tasking). Graceful degradation is the process of controlled adjustments to user experience quality in order to continue to serve the user and avoid catastrophic shutdown due to depletion of limited resources, such as thermal headroom or battery. Ineffective graceful degradation may reduce the user experience too slowly, too quickly, or in inappropriate and ineffective ways that do not relieve the pressure on bottleneck resources.

In some examples of the present disclosure, adaptive cross-layer power, thermal, and performance management within augmented and/or virtual reality (AR/VR) display devices is described. AR/VR experiences use extensive system resources to provide high quality user experience (UX). Application performance modes (e.g., Application Resource Bundles "ARBs") may be registered and for each mode, applications may request specific performance from the underlying hardware/firmware/software subsystems. As system state changes, a central service may periodically reconfigure power states of individual subsystems resulting in power, thermal, and performance tradeoffs. As the power states are reconfigured, the central service may change the application performance modes to allow applications to adapt their UX to the new system state allowing applications to build custom behaviors and provide enhanced UX over a variety of states.

While some advantages and benefits of the present disclosure are apparent, other advantages and benefits may include reduction of computational resources and power consumption, thermal management, and enhanced user experience (UX) in augmented and/or virtual reality (AR/VR) systems.

FIG. 1 illustrates a block diagram of an artificial reality system environment 100 including a near-eye display, according to an example. As used herein, a "near-eye display" may refer to a device (e.g., an optical device) that may be in close proximity to a user's eye. As used herein, "artificial reality" may refer to aspects of, among other things, a "metaverse" or an environment of real and virtual elements and may include use of technologies associated with virtual reality (VR), augmented reality (AR), and/or mixed reality (MR). As used herein a "user" may refer to a user or wearer of a "near-eye display."

As shown in FIG. 1, the artificial reality system environment 100 may include a near-eye display 120, an optional external imaging device 150, and an optional input/output interface 140, each of which may be coupled to a console 110. The console 110 may be optional in some instances as the functions of the console 110 may be integrated into the near-eye display 120. In some examples, the near-eye display 120 may be a head-mounted display (HMD) that presents content to a user.

In some instances, for a near-eye display system, it may generally be desirable to expand an eye box, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular head-mounted display (HMD)) or both eyes (for binocular head-mounted displays (HMDs)). Also, as used herein, an "eye box" may be a two-dimensional box that may be positioned in front of the user's eye from which a displayed image from an image source may be viewed.

In some examples, in a near-eye display system, light from a surrounding environment may traverse a "see-through" region of a waveguide display (e.g., a transparent substrate) to reach a user's eyes. For example, in a near-eye display system, light of projected images may be coupled into a transparent substrate of a waveguide, propagate within the waveguide, and be coupled or directed out of the waveguide at one or more locations to replicate exit pupils and expand the eye box.

In some examples, the near-eye display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display 120 may be implemented in any suitable form-factor, including a head-mounted display (HMD), a pair of glasses, or other similar wearable eyewear or device. Examples of the near-eye display 120 are further described below with respect to FIGS. 2 and 3. Additionally, in some examples, the functionality described herein may be used in a head-mounted display (HMD) or headset that may combine images of an environment external to the near-eye display 120 and artificial reality content (e.g., computer-generated images). Therefore, in some examples, the near-eye display 120 may augment images of a physical, real-world environment external to the near-eye display 120 with generated and/or overlaid digital content (e.g., images, video, sound, etc.) to present an augmented reality to a user.

In some examples, the near-eye display 120 may include any number of display electronics 122, display optics 124, and an eye tracking unit 130. In some examples, the near-eye display 120 may also include one or more locators 126, one or more position sensors 128, and an inertial measurement unit (IMU) 132. In some examples, the near-eye display 120 may omit any of the eye tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the near-eye display 120 may include a projector (not shown), which may form an image in angular domain for direct observation by a viewer's eye through a pupil. The projector may employ a controllable light source (e.g., a laser source) and a micro-electromechanical system (MEMS) beam scanner to create a light field from, for example, a collimated light beam. In some examples, the same projector or a different projector may be used to project a fringe pattern on the eye, which may be captured by a camera and analyzed (e.g., by the eye tracking unit 130) to determine a position of the eye (the pupil), a gaze, etc.

In some examples, the display optics 124 may display image content optically (e.g., using optical waveguides and/or couplers) or magnify image light received from the display electronics 122, correct optical errors associated with the image light, and/or present the corrected image light to a user of the near-eye display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (IMU) 132, internal to the inertial measurement unit (IMU) 132, or any combination thereof. Based on the one or more measurement signals from the one or more position sensors 128, the inertial measurement unit (IMU) 132 may generate fast calibration data indicating an estimated position of the near-eye display 120 that may be relative to an initial position of the near-eye display 120. For example, the inertial measurement unit (IMU) 132 may integrate measurement signals received from accelerometers over time to estimate a velocity vector and integrate the velocity vector over time to determine an estimated position of a reference point on the near-eye display 120. Alternatively, the inertial measurement unit (IMU) 132 may provide the sampled measurement signals to the optional console 110, which may determine the fast calibration data.

The eye tracking unit 130 may include one or more eye tracking systems. As used herein, "eye tracking" may refer to determining an eye's position or relative position, including orientation, location, and/or gaze of a user's eye. In some examples, an eye tracking system may include an imaging system that captures one or more images of an eye and may optionally include a light emitter, which may generate light (e.g., a fringe pattern) that is directed to an eye such that light reflected by the eye may be captured by the imaging system (e.g., a camera). In other examples, the eye tracking unit 130 may capture reflected radio waves emitted by a miniature radar unit. These data associated with the eye may be used to determine or predict eye position, orientation, movement, location, and/or gaze.

In some examples, the near-eye display 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display 120 for presentation to the user in accordance with information received from one or more of external imaging device 150, the near-eye display 120, and the input/output interface 140. For example, in the example shown in FIG. 1, the optional console 110 may include an application store 112, a headset tracking module 114, a virtual reality engine 116, and an eye tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optional console 110 may or may not be needed or the optional console 110 may be integrated with or separate from the near-eye display 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display 120 using slow calibration information from the external imaging device 150. For example, the headset tracking module 114 may determine positions of a reference point of the near-eye display 120 using observed locators from the slow calibration information and a model of the near-eye display 120. Additionally, in some examples, the headset tracking module 114 may use portions of the fast calibration information, the slow calibration information, or any combination thereof, to predict a future location of the near-eye display 120. In some examples, the headset tracking module 114 may provide the estimated or predicted future position of the near-eye display 120 to the virtual reality engine 116.

In some examples, the virtual reality engine 116 may execute applications within the artificial reality system environment 100 and receive position information of the near-eye display 120, acceleration information of the near-eye display 120, velocity information of the near-eye display 120, predicted future positions of the near-eye display 120, or any combination thereof from the headset tracking module 114. In some examples, the virtual reality engine 116 may also receive estimated eye position and orientation information from the eye tracking module 118. Based on the received information, the virtual reality engine 116 may determine content to provide to the near-eye display 120 for presentation to the user.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

As mentioned herein, a number and variety of AR/VR applications and resources may be used in conjunction with providing the AR/VR experience to a user. Adaptive cross-layer power, thermal, and performance management may be implemented within the head-mounted display (HMD) device. Application performance modes (e.g., Application Resource Bundles "ARBs") may be registered and for each mode, applications may request specific performance from the underlying hardware/firmware/software subsystems. As system state changes, a central service (e.g., a device health manager) may periodically reconfigure power states of individual subsystems resulting in power, thermal, and performance tradeoffs. As the power states are reconfigured, the central service may change the application performance modes to allow applications to adapt their UX to the new system state allowing applications to build custom behaviors and provide enhanced UX over a variety of states.

Figure 2A:
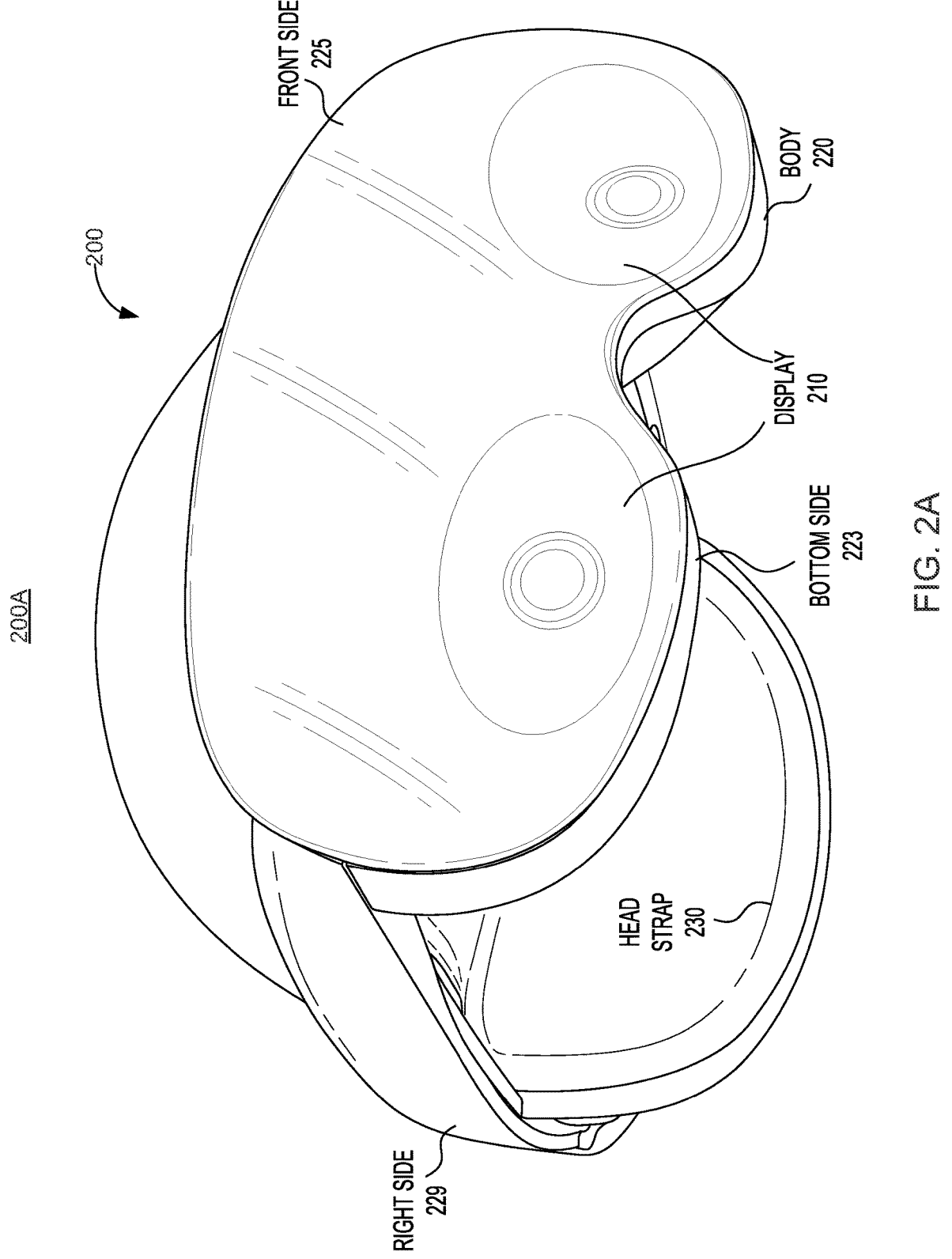
FIGS. 2A-2C illustrate various views of a near-eye display device in the form of a head-mounted display (HMD) device, according to examples.
Figure 2B:
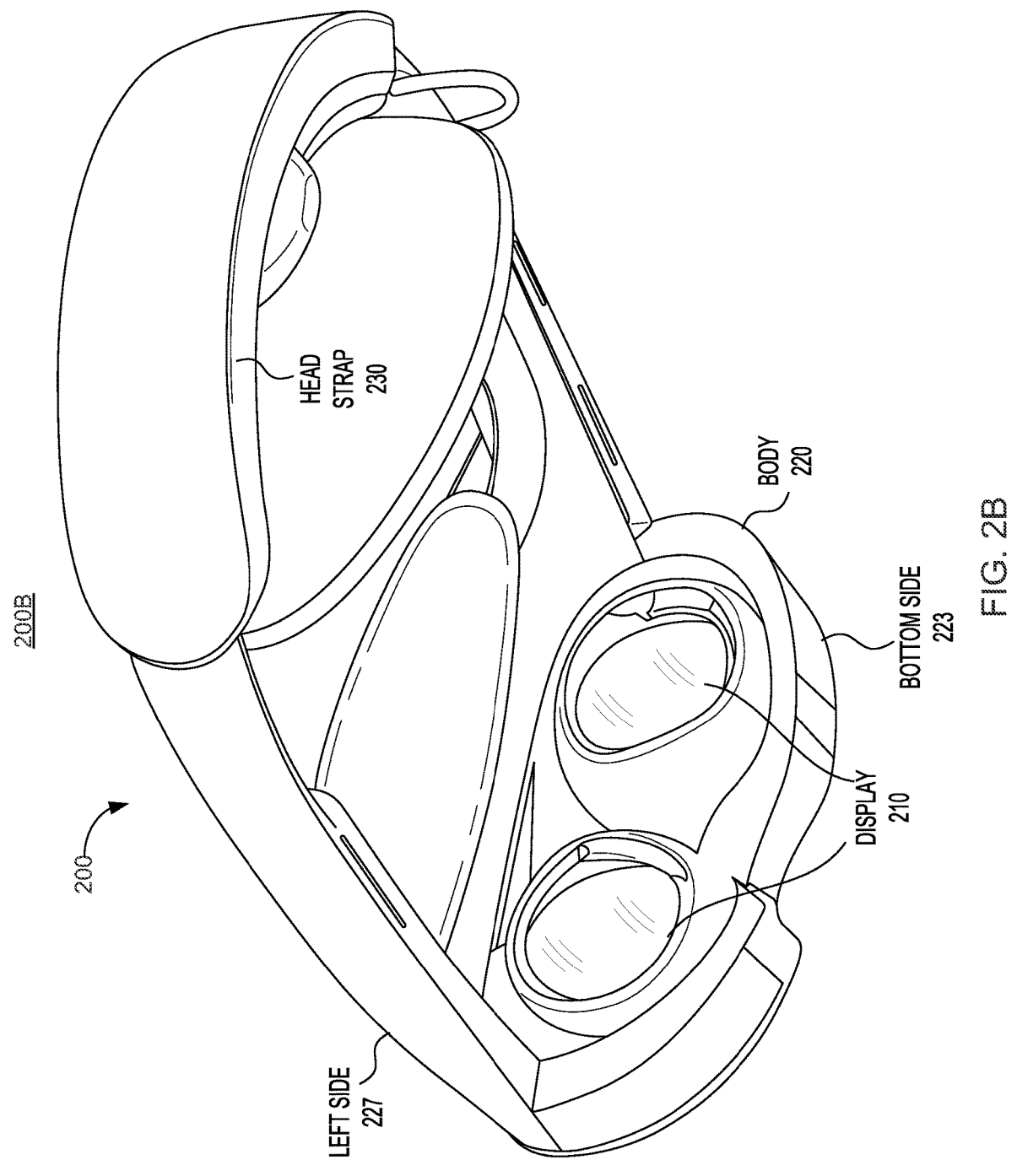
Figure 2C:
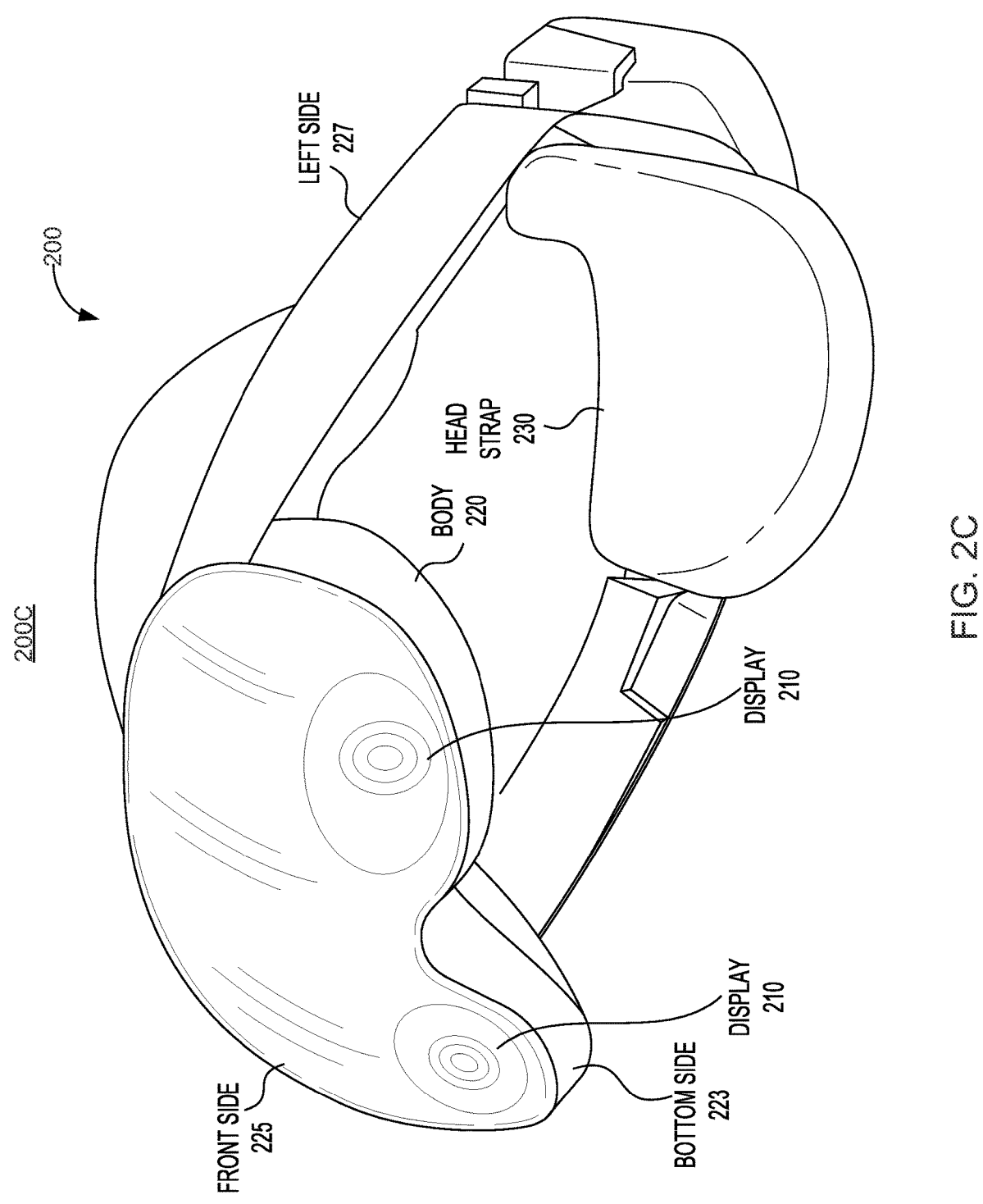

FIGS. 2A-2C illustrate various views of a near-eye display device in the form of a head-mounted display (HMD) device 200, according to examples. In some examples, the head-mounted device (HMD) device 200 may be a part of a virtual reality (VR) system, an augmented reality (AR) system, a mixed reality (MR) system, another system that uses displays or wearables, or any combination thereof. As shown in diagram 200A of FIG. 2A, the head-mounted display (HMD) device 200 may include a body 220 and a head strap 230. The front perspective view of the head-mounted display (HMD) device 200 further shows a bottom side 223, a front side 225, and a right side 229 of the body 220. In some examples, the head strap 230 may have an adjustable or extendible length. In particular, in some examples, there may be a sufficient space between the body 220 and the head strap 230 of the head-mounted display (HMD) device 200 for allowing a user to mount the head-mounted display (HMD) device 200 onto the user's head. For example, the length of the head strap 230 may be adjustable to accommodate a range of user head sizes. In some examples, the head-mounted display (HMD) device 200 may include additional, fewer, and/or different components such as a display 210 to present a wearer augmented reality (AR)/virtual reality (VR) content and a camera to capture images or videos of the wearer's environment.

As shown in the bottom perspective view of diagram 200B of FIG. 2B, the display 210 may include one or more display assemblies and present, to a user (wearer), media or other digital content including virtual and/or augmented views of a physical, real-world environment with computer-generated elements. Examples of the media or digital content presented by the head-mounted display (HMD) device 200 may include images (e.g., two-dimensional (2D) or three-dimensional (3D) images), videos (e.g., 2D or 3D videos), audio, or any combination thereof. In some examples, the user may interact with the presented images or videos through eye tracking sensors enclosed in the body 220 of the head-mounted display (HMD) device 200. The eye tracking sensors may also be used to adjust and improve quality of the presented content.

In some examples, the head-mounted display (HMD) device 200 may include various sensors (not shown), such as depth sensors, motion sensors, position sensors, and/or eye tracking sensors. Some of these sensors may use any number of structured or unstructured light patterns for sensing purposes. In some examples, the head-mounted display (HMD) device 200 may include an input/output interface for communicating with a console communicatively coupled to the head-mounted display (HMD) device 200 through wired or wireless means. In some examples, the head-mounted display (HMD) device 200 may include a virtual reality engine (not shown) that may execute applications within the head-mounted display (HMD) device 200 and receive depth information, position information, acceleration information, velocity information, predicted future positions, or any combination thereof of the head-mounted display (HMD) device 200 from the various sensors.

In some examples, the information received by the virtual reality engine may be used for producing a signal (e.g., display instructions) to the display 210. In some examples, the head-mounted display (HMD) device 200 may include locators (not shown), which may be located in fixed positions on the body 220 of the head-mounted display (HMD) device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

It should be appreciated that in some examples, a projector mounted in a display system may be placed near and/or closer to a user's eye (i.e., "eye-side"). In some examples, and as discussed herein, a projector for a display system shaped like eyeglasses may be mounted or positioned in a temple arm (i.e., a top far corner of a lens side) of the eyeglasses. It should be appreciated that, in some instances, utilizing a back-mounted projector placement may help to reduce size or bulkiness of any required housing required for a display system, which may also result in a significant improvement in user experience for a user.

In some examples, an adaptive cross-layer power and performance management service may be used in the head-mounted display (HMD) device 200. Software and hardware stacks may be accessed for gathering end-to-end knowledge of a current state of the head-mounted display (HMD) device 200, and then the service may make optimal power and thermal management decisions to achieve desired performance. As the head-mounted display (HMD) device 200 state changes, the central service may periodically reconfigure the power states of individual subsystems resulting in power and performance tradeoffs.

Figure 3:
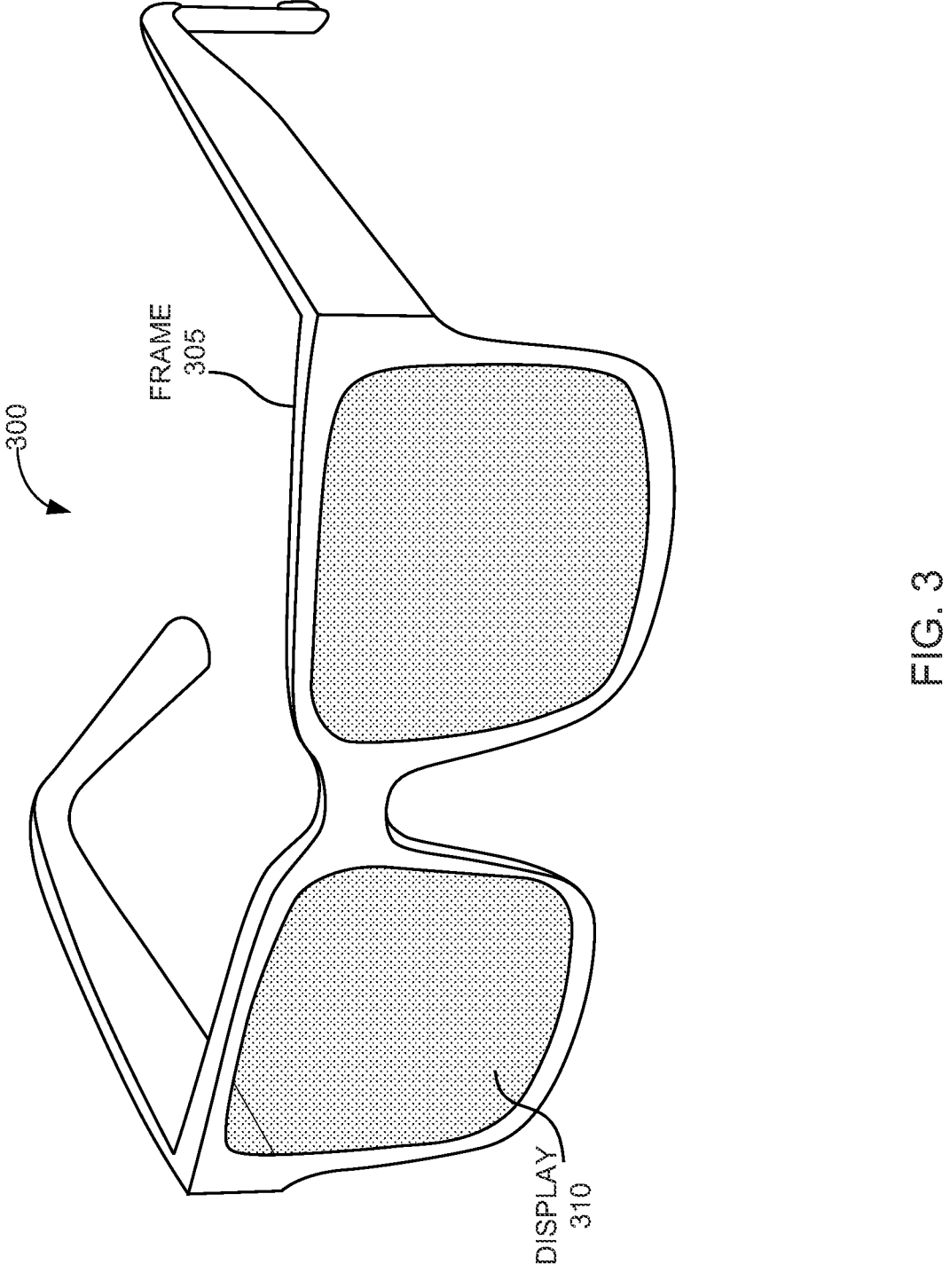
FIG. 3 illustrates a perspective view of a near-eye display in the form of a pair of glasses, according to an example.

FIG. 3 is a perspective view of a near-eye display 300 in the form of a pair of glasses (or other similar eyewear), according to an example. In some examples, the near-eye display 300 may be a specific example of near-eye display 120 of FIG. 1 and may be configured to operate as a virtual reality display, an augmented reality (AR) display, and/or a mixed reality (MR) display.

In some examples, the near-eye display 300 may include a frame 305 and a display 310. In some examples, the display 310 may be configured to present media or other content to a user. In some examples, the display 310 may include display electronics and/or display optics, similar to components described with respect to FIGS. 1 and 2A-2C. For example, as described above with respect to the near-eye display 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc. In other examples, the display 310 may include a projector, or in place of the display 310 the near-eye display 300 may include a projector.

In some examples, the near-eye display 300 may further include various sensors on or within a frame 305. In some examples, the various sensors may include any number of depth sensors, motion sensors, position sensors, inertial sensors, and/or ambient light sensors, as shown. In some examples, the various sensors may include any number of image sensors configured to generate image data representing different fields of views in one or more different directions. In some examples, the various sensors may be used as input devices to control or influence the displayed content of the near-eye display, and/or to provide an interactive virtual reality (VR), augmented reality (AR), and/or mixed reality (MR) experience to a user of the near-eye display 300. In some examples, the various sensors may also be used for stereoscopic imaging or other similar applications.

In some examples, the pupil-replicating waveguide may be transparent or translucent to enable the user to view the outside world together with the images projected into each eye and superimposed with the outside world view. The images projected into each eye may include objects disposed with a simulated parallax, so as to appear immersed into the real-world view.

Figure 4:
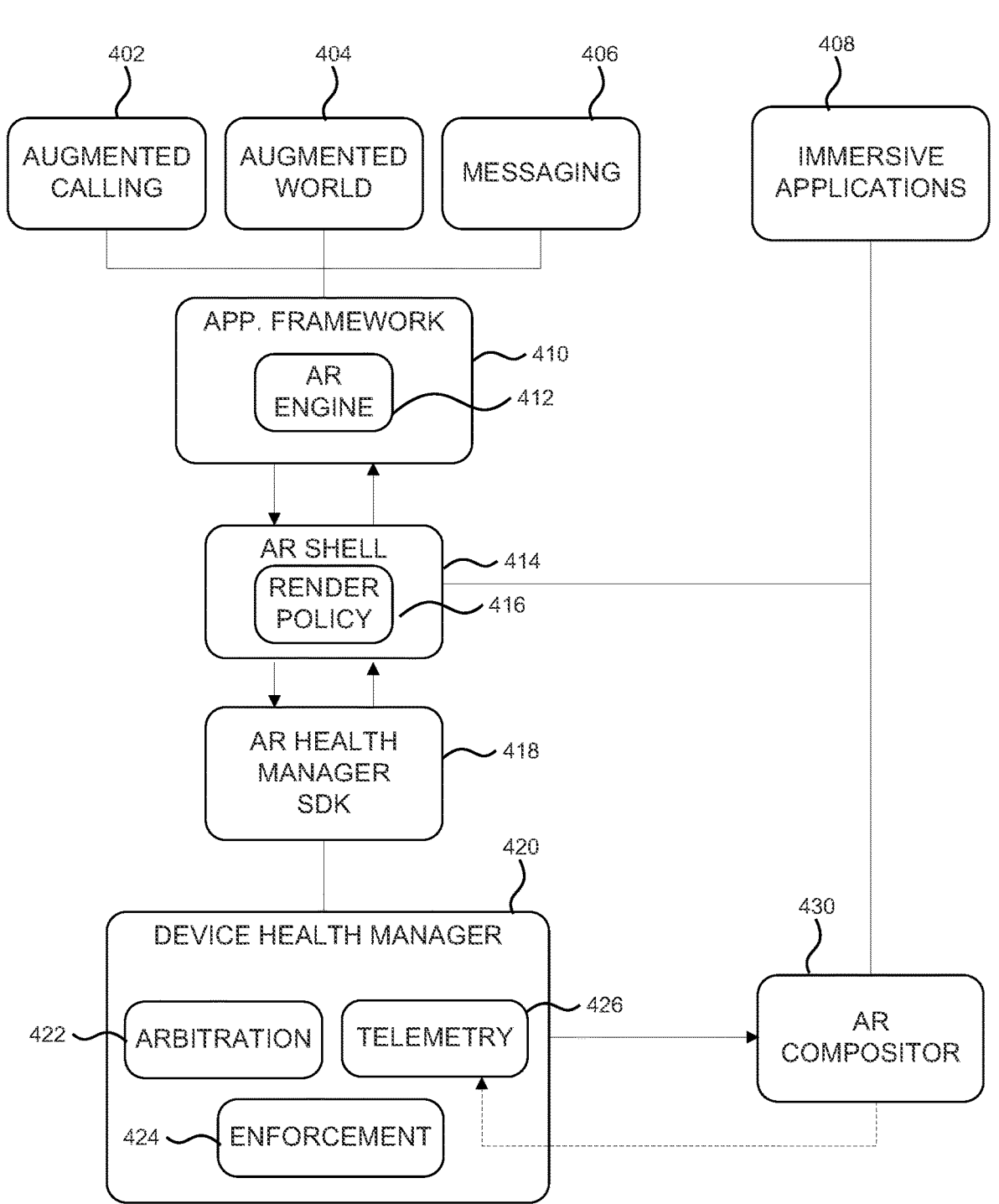
FIG. 4 illustrates an augmented and/or virtual reality (AR/VR) application framework interaction model with system resource manager, according to an example.

FIG. 4 illustrates an augmented and/or virtual reality (AR/VR) application framework interaction model with system resource manager, according to an example.

Diagram 400 shows various applications such as augmented calling application 402, augmented world application 404, messaging application 406, and immersive applications 408. The augmented calling application 402, augmented world application 404, and messaging application 406 may operate within an application framework 410, which may include an augmented reality (AR) engine 412. An AR shell 414, which includes render policy 416, may provide a selected application resource bundle (ARB) to the application framework 410 and receive all ARBs from the application framework 410. An AR shell is software program that exposes an operating system's services to a user or other programs. The AR shell 414 may provide the ARBs to an AR health manager software development kit (SDK) 418 and receive device health manager (DHM) resource budgets from the AR health manager SDK 418. The DHM 420 may include arbitration module 422, telemetry module 426, enforcement module 424, and other applicable modules. The DHM 420 may receive information from telemetry sources and kernels, and may interact with the AR shell 414 and immersive applications 408 (that do not use the AR shell) through an AR compositor 430. The applications and application framework 410 form the application layer, while the AR shell 414 is the shell layer, and the AR health manager SDK 416, the AR compositor 430, and the DHM 420 are part of the operating system (OS) layer.

AR display devices present novel challenges in power, performance and thermal management. Traditional smartphone/mobile device power-management techniques do not provide a path to achieving all-day battery life and comfortable thermals due to multiple challenges. For example, near-eye display devices (AR glasses) have a novel form-factor (light, wearable multi-device configuration with small batteries), high performance demands (high framerate displays, a wide array of sensors), high power consumption (due to waveguide optics, projectors, cameras and other sensors, accelerators, etc.), heavy usage (all-day intermittent usage both indoor and outdoor, with few options for charging), and novel developer patterns (heavy reliance on multitasking).

Graceful degradation is the process of controlled adjustments to user experience quality in order to continue to serve the user and avoid catastrophic shutdown due to depletion of limited resources, such as thermal headroom or battery. Effective graceful degradation means the user gets the highest quality experience possible for as long as possible given their usage scenario and the current environmental conditions. Ineffective graceful degradation may reduce the user experience too slowly, too quickly, or in inappropriate and ineffective ways that do not relieve the pressure on bottleneck resources. Slow or ineffective graceful degradation may lead to sudden and disruptive drops in quality or even emergency shutdown. For example, augmented calling applications may provide audio and/or video calling services augmented with virtual reality content (e.g., dynamic avatars, information associated with the call, etc.). During augmented calling, a sudden switch from holograms to voice-only as the device overheats may be unnecessarily disruptive. A better approach may be to smoothly reduce quality over time, dropping into lower quality holograms or 2D first, and preemptively shutting down background activities and augments. A more aggressive strategy may even preemptively start the call with a lower quality hologram if environmental conditions and expected call duration imply major throttling may occur, in order to provide a more consistent experience for a longer duration. In any of these example situations, the user's experience is degraded relative to the optimum they may see with the device, but the device is still functional.

The DHM 420 is an OS-level performance and energy management component whose goal is to coordinate across different layers of the software stack on the AR/VR device to achieve optimal performance and energy tradeoffs. A service is an OS component that provides some shared functionality used by multiple applications, for example, SLAM camera, depth camera, RGB camera, hand tracking, GPU subsystem, display, wireless subsystem, etc. A service consumes power and generates heat. Most services support at least two states at which they can operate: on or off, with the "off" state saving power. Some services may further be capable of operating in degraded states beyond just off. For example, hand tracking may support a lower tracking accuracy. Service Levels may be represented by discrete values or categories such as high/med/low/off or on/off depending on the service. A set of services and service levels together form a resource budget (DHM resource budget). The DHM resource budget may include information that may be provided by the DHM 420 to clients that can limit resource usage such as AR Shell 414. The DHM 420 may inform clients of one or more services and their current service levels that they can support. The receiver may be responsible for enforcing the budget.

An application may support several preset modes of operation where each preset mode utilizes a subset of services, each at a particular service level. Applications may define a set of resource bundles (Application resource bundles "ARBs") where each bundle represents a "mode". Each mode entry may list the subset of services used in that mode and the desired service level. The ARBs may be used in communication between the application(s), the application framework, and the AR Shell to communicate the application's performance needs at launch. To adapt to changing operating conditions, the system (DHM+AR Shell) may notify the application to switch to a lower resource bundle in response to a degradation event.

As mentioned herein, the layers of the architecture may include an OS layer (DHM, AR compositor, wireless subsystem, etc.), a shell layer (AR shell core, shell UX), and application layers (application frameworks and applications themselves for collaborative applications and immersive applications). Examples of collaborative applications may include, but are not limited to, AR camera, browser, augmented world, augmented calling, messaging, etc., which may be executed in parallel (and displayed together). Examples of immersive applications may include games, etc., which may be displayed alone (e.g., covering the entire display).

In some examples, the device health manager (DHM) 420 may be centrally responsible for tracking resource utilization, budgeting, and orchestrating arbitration. The DHM 420 may receive telemetry and maintain an up-to-date picture of system resource utilization, and maintain the available 'runway' for various resources and take actions both proactively and reactively. Through orchestration, the components may be prevented from taking conflicting adaptation actions. The AR health manager SDK 418 may allow callers to register for events that require adaptation. When these events occur, for example, when thermal or power thresholds are met, DHM may compute resource budgets and notify listeners (applications, application framework) that adaptation is needed. Additionally, DHM may also allow applications to query the remaining power and thermal headroom.

To intelligently create budgets, the DHM 420 may require 'hints' from the application(s) on the services that an application may use and the service levels that they support. These hints may take the form of ARBs. Applications may provide these hints to the application framework 410 and the AR shell 414. The AR shell 414 may be responsible for selecting the right resource bundle based on the resource budgets provided to it by the DHM 420 and for notifying the DHM 420 of the selected bundle.

The individual responsibilities may include for the DHM 420, monitoring operating conditions and notifying individual system level components in sequence; for the AR Shell 414, receiving budget notifications and enacting system-level mitigations, selecting appropriate resource bundles and notifying the DHM of bundle selection; for other system services (e.g., wireless subsystem), receiving budget notifications and enacting system-level mitigations; for the application framework, receiving notifications and enacting mitigations on behalf of the framework applications; and for the applications, receiving notifications and enacting application-specific mitigations. It should be noted that each layer in the system may be responsible for taking mitigation actions that it is capable of handling, and only deferring to upper layers if necessary. This may reduce the failure surface and limit the number of actors.

The DHM 420 may support both proactive and reactive management approaches. Reactive management involves the DHM reacting to changing operating conditions using application hints, current metrics and events, and orchestrating mitigations. Proactive management involves the DHM building modeling to predict future states to make management decisions. It should be noted that a key differentiator is the use of predictive modeling. With both management approaches, the API and data shared between application/application frameworks and the DHM may be the same. By combining the two approaches, not only can the platform manage the constantly evolving system state in real time, but it may also ensure that the user's overall experience in an average use case can be met.

Figure 5:
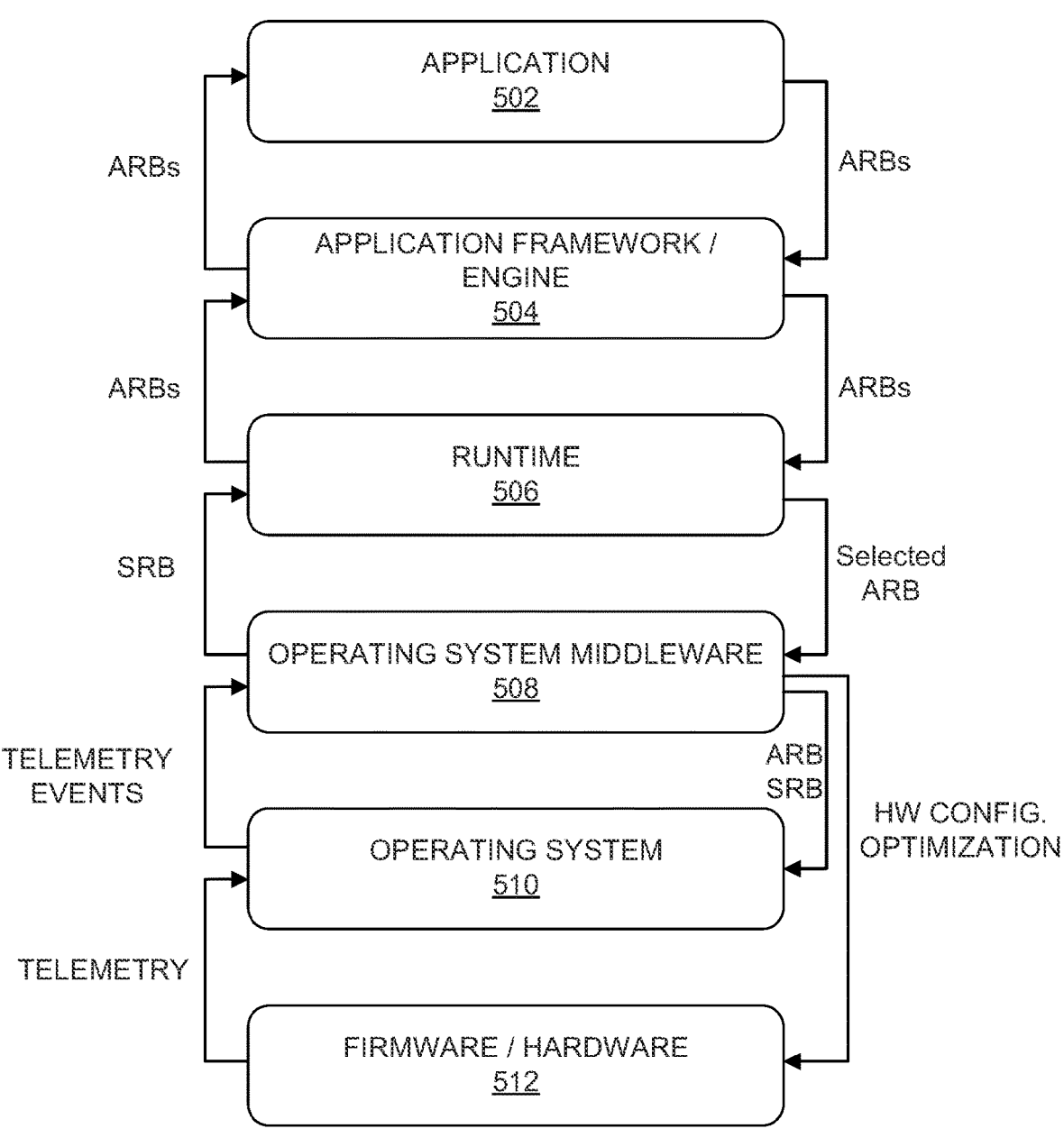
FIG. 5 illustrates various layers in an AR/VR display device, according to an example.

FIG. 5 illustrates various layers in an AR/VR display device, according to an example.

Diagram 500 shows example layers including application layer 502, application framework/engine layer 504, runtime layer 506, operating system middleware layer 508, operating system layer 510, and firmware/hardware layer 512. The application layer 502, the application framework/engine layer 504, and the runtime layer 506 exchange ARBs, while the runtime layer 506 provide selected ARBs to the operating system middleware layer 508 and receives DHM resource budget (also referred to as system resource budget "SRB") from the operating system middleware layer 508. The operating system middleware layer 508 provides ARB and SRB to the operating system layer 510 and hardware configuration optimization to the firmware/hardware layer 512. The firmware/hardware layer 512 provides telemetry to the operating system layer 510, which provides telemetry events to the operating system middleware layer 508.

At the application layer 502, applications and application runtimes may understand user habits and relative priorities among all of the services that are required to deliver the best UXs. This information may be used for making power management tradeoffs and for directing the available power to the appropriate services. A shell layer (the runtime layer 506 and the operating system middleware layer 508) is an intermediate layer that is located between the application layer 502 and the OS layer 510. The shell layer may be configured to handle the shell core and the shell UX. The OS layer 510 may be configured to arbitrate across all applications and services. The OS layer 510 may possess a unique visibility into the relative priorities across applications and services for current operation and may determine the activeness or operation state of applications (e.g., determine which applications are in foreground, which ones are in the background, etc.). Additionally, the OS layer 510 may also handle the device health manager (DHM); the compositor, the wireless subsystem; etc. Within each block of the OS layer 510, each system-on-chip (SOC) may have the visibility of its own shared common resources utilizations, such as utilization of a power on shared power management integrated circuit (PMIC) rail; a shared network-on-chip (NOC) network; and a shared memory path. The SOC may track and manage common resources based on the dynamic live traffic. A DHM sublayer may be responsible for tracking resource utilization, budgeting, and executing arbitration. The DHM sublayer may be configured to receive telemetry and maintain an up-to-date picture of system resource (SR) utilization as mentioned herein.

In an example use case, a user may be in a realistic representation call and the computing unit skin temperature threshold may be violated, the system may implement one or more mitigation countermeasures, such as, switching to an avatar call. An avatar call utilizes graphic representations of participants in the call instead of live video, thus utilizing less bandwidth, power, system resources. In another example use case, the user may be operating in a space with multiple augments. In this example, a few default optimizations may already be active (e.g., dimming inactive augments). Additionally, a headset skin temperature threshold violation may be triggered. The system may activate additional mitigations, such as: dimming active augments; glinting inactive augments, etc.

As mentioned herein, applications register multiple performance modes (Application Resource Bundles) such that in each mode applications request specific performance from underlying hardware/firmware/software subsystems. A central OS layer service (DHM) may gather all these registered modes and configure power to subsystems to achieve the desired performance with minimal power consumption. Further, as the hardware is utilized, the central service may gather telemetry from hardware/firmware and software subsystems around power and thermal states to predict power and thermal headroom.

As the system state changes, i.e., applications launch/terminate or the system begins to approach power/thermal limits, the central service may periodically reconfigure the power states of individual subsystems to make power and performance tradeoffs. As the service reconfigures power states, the service may change the application performance modes to allow applications to adapt their UX to the new system state. This may allow the applications to build custom behaviors that provide the best UX in a variety of states while retaining the flexibility to allow the operating system and underlying layers to react without involving individual applications. Critical mitigations may be implemented independent of application involvement. The OS may also choose to prioritize applications based on prior knowledge to support high quality user experiences.

The hierarchical, layered approach described herein may be needed for a number of reasons, for example, visibility. Each layer may have increased visibility about certain aspects of the system that are not available to other layers: At the application layer, applications and application runtimes may understand the users' habits and relative priorities among all the services required to deliver the best user experiences and use for making power management tradeoffs to direct the available power to the right services. The OS layer may arbitrate across all applications and services with a unique visibility into the relative priorities across applications and services for current operation. At this layer, the OS may aggregate together a combined "service level" amongst all services needed by individual applications. The OS layer may also be aware of a current state of power consumption and performance for each service. Together with the application layer, the OS layer may play an important role ensuring all power energy applies to the right services for the optimal user experience.

The OS layer may understand where the power performance bottlenecks are and the power performance sensitivity of the segments. Each body in a multi-body AR/VR system may track its own independent enclosure temperature and battery condition. The "body" refers to near-eye display device, handheld computing device, etc. which are examples of bodies in the multi-body system. Within a body, each SOC may have the visibility of its own shared common resources utilizations, such as power on shared PMIC rail, utilization of shared NOC network and shared memory path. It may track and manage the common resource according to the dynamic live traffic. Within each SOC, there are subsystems or segments of compute pipes, and this level has the visibility of the pipe dynamic traffic and local resource utilization, such as number of computation cores, local thermal hotspots etc. The information may be used to allocate the resources based on the demand, power consumption and performance sensitivity of the allocated resource. The difference between SOC layer and subsystem layer is that SOC layer tracks and manages the shared resources in SOC and subsystem layer focuses on the resource dedicated to the subsystem itself.

The hierarchical, layered approach may also be needed for response latency and processing bandwidth. The responsiveness (latency) of a power management scheme is critical for the effectiveness of power management. The occurrence of power/thermal events and the power optimization opportunities are dynamic. The time scale of such events/opportunities may range from months (for silicon aging margin recovery) to hundreds of microseconds (resource utilization variance due to dynamic traffic). Each layer of power management may respond to events within their ability. The application layer may respond over the course of minutes while subsystem layers may respond in hundreds of microseconds. Therefore, the three major power management components may be distributed across hierarchical layers: the event/opportunity detection (through telemetry collection and post processing); rendering of control algorithm decision of power management; execution of control decision: and enacting mitigations.

Through the distributed, hierarchical approach the needed processing bandwidth may be spread across all layers for feasibility and better scalability. The system may utilize processing bandwidth to monitor the system status and detect power optimization opportunities. The monitored telemetry may need pre- and post-processing such as calculating leakage based on local temperature and power rail voltage. Detecting power optimization opportunities and generating control decisions may involve complex computations, which require processing bandwidth.

Figure 6:
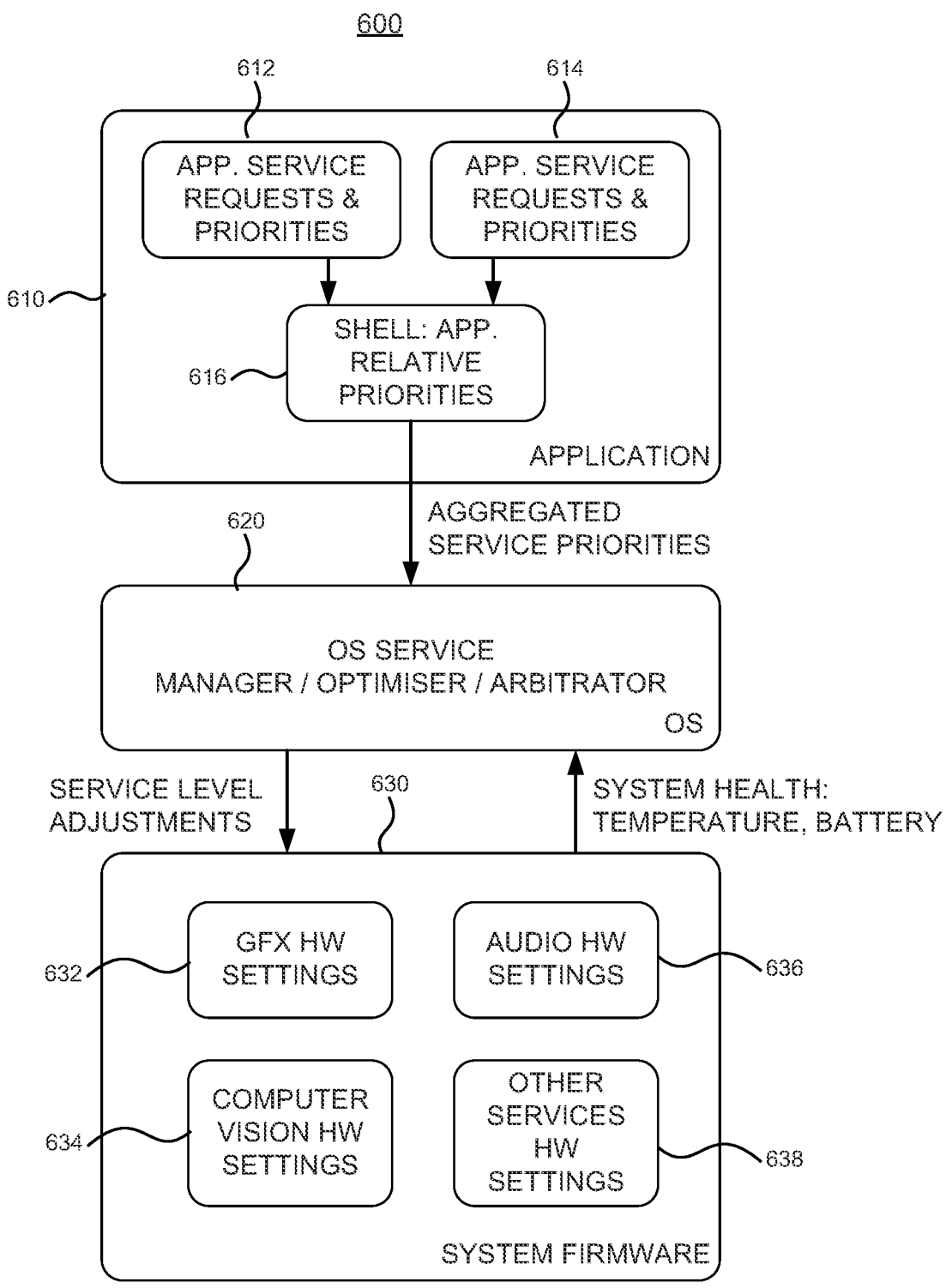
FIG. 6 illustrates a diagram representing management of service priorities in an AR/VR display device, according to an example.

FIG. 6 illustrates a diagram representing management of service priorities in an AR/VR display device, according to an example.

Diagram 600 shows application 610 with application service requests and priorities 612 and 614, and shell application relative priorities 616. The application 610 provides aggregated service priorities to an OS service manager/optimizer/arbitrator (e.g., DHM) within the OS 620. The OS 620 provides service level adjustments based on priorities to system firmware 630 and receives system health information such as temperature, battery power level, etc. from the system firmware 630. The system firmware 630 may include graphics hardware settings 632, computer vision settings 634, audio hardware settings 636, and other services hardware settings 638.

AR/VR systems involve many more services (eye tracking, hand tracking, head tracking, multiple cameras, EMG etc.) than traditional mobile devices, such as multiple depth cameras, wearable controls, head mount display, wireless communication across multiple parts. This nature of the AR/VR system poses major challenges to power and performance management. For example, portability is an issue due to small battery capacity, high thermal density and small enclosure surface, and slow thermal dissipation rate. Wearability is another challenge due to close vicinity to human skin and, therefore, low enclosure thermal limit. Immersiveness requires continuous display in the user's vision field. For user's comfort, services that are sensitive to users (such as GFX frame rate, display contrast, display fill rate levels) need to be relatively stable while the application or multiple applications are running in parallel. This may limit service level change rate and the choices of power/thermal mitigation without the user's consent. Thus, AR/VR wearable devices have very limited resources to be split among all services needed. Furthermore, users may be a lot more sensitive to the experience provided by a service. Therefore, directing limited system resources based on service priorities may assist system power and performance management.

In the application layer, multiple applications may be executed in parallel. Thus, there may be priorities among applications. These priorities among applications may be determined based on criteria such as whether an application is in the foreground or in the background, whether the user is gazing onto an augment of a given application, or whether the user's location is detected to be in vicinity of a world locked augment which belongs to an application, etc. In some examples, an application multiplexing component (e.g., AR shell) may be used with visibility to all applications/augments running and their context. The application multiplexing component may act as a key enabler to provide guidance on priority of other applications/augments based on user gaze, location, etc.

The applications may express the priorities among all services within an application based on user experience preferences. For example, in an augmented call, audio service may be more important than graphics quality which in turn may be more important than hand tracking services. The priority within an application and the priorities among all running applications may be combined to form the final priority levels of all available services (Audio, GFX, computer vision, wireless etc.). These priority levels may define the relative importance among all applications and services to user experiences.

With the service priorities provided to the operating system, the OS may determine how services can be throttled if a common shared system resource reaches a system budget limit and the system needs to be constrained. The shared common resource may be system battery, thermal, shared data path bandwidth such as wireless or shared memory, shared application processor bandwidth etc. When system constraint happens or priority level is updated (user priority is shifted from one application to another, for example), the OS may provide the power and performance guidelines to lower power and performance levels (such as system firmware) to optimize the system vertically. This may ensure that the entire AR/VR system provides the best user experiences with limited system resource budgets.

In an example scenario, each application may indicate its requested services and the priorities among the services. An application layer application-multiplexing component, such as AR shell may aggregate service priorities across the applications and pass on to the OS based on the relative priorities among applications (e.g., based on foreground, background application, users' attention point, application augment locations and distances from user, etc.). At a later point, the system may reach one or more constraints, for example, temperature too high or battery too low. The OS service manager, based on the service priorities, may make service adjustments and recompute the resources to be distributed to each service. Service level adjustments may be passed on to the system firmware layer. System firmware may update hardware settings accordingly, and service user experience may be reduced based on the determined priorities.

Accordingly, availability of application and OS service priorities to resource management services may empower these resource management services to make power and thermal management decisions, which may result in better user experience. This may be achieved by considering the relative importance of application and OS services to user experience in power and thermal management decisions.

Figure 7:
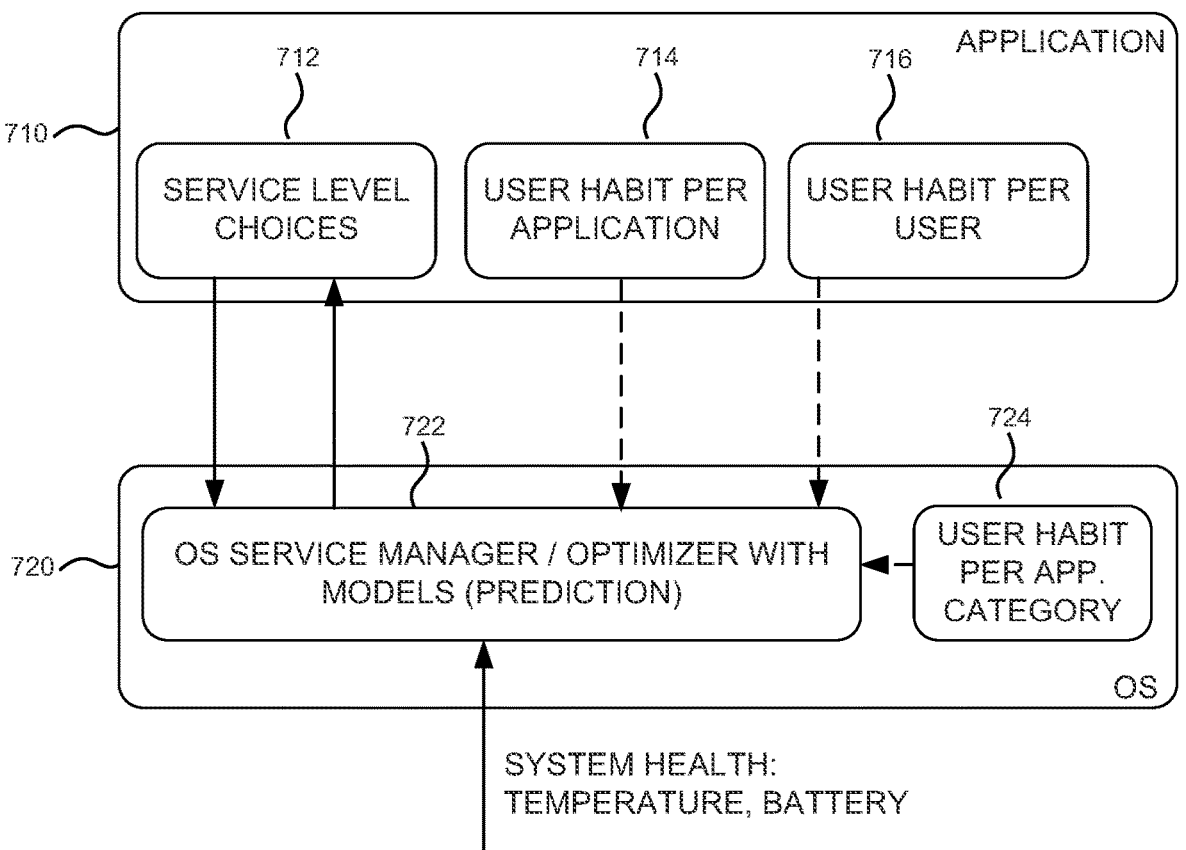
FIG. 7 illustrates a diagram representing a special case of service priorities management based on user habit in an AR/VR display device, according to an example.

FIG. 7 illustrates a diagram representing a special case of service priorities management based on user habit in an AR/VR display device, according to an example.

Diagram 700 shows an application 710 with service level choices 712, user habit information per application 714, and user habit information per user 716. The service level choices 712 may be provided to an OS service manager/optimizer 722 with models (to predict thermal, battery, etc. headroom) within the OS 720. The user habit information per application 714 and the user habit information per user 716 may also be provided to the OS service manager/optimizer 722 along with user habit information per application category 724 from the OS 720. The OS service manager/optimizer 722 may also receive system health information such as temperature, battery levels, change rates, etc. and then select appropriate service levels to fulfill user's habit.

AR/VR wearable devices typically have very limited battery capacity and thermal budget due to the wearable design. AR/VR applications may also use various system services (graphics, wireless, audio, tracking, etc.), at the same time at high performance levels resulting in significant resource consumption. If applications are launched at maximum performance level, the service levels of various subsystems (e.g., framerate, fill rate, etc.) may need to be reduced quickly (e.g., in a few mins or less) depending upon battery and thermal conditions, resulting in substantial degradation of the user experience.

Some approaches may leave it to the user, but if the choice is left to the user to reduce the service levels, the user may be asked frequently to make a service degradation choice making the user experience unstable and unpleasant throughout a typical run time (e.g., 30 mins for AC application). The traditional user prompt approach in power and performance management to select service level (prompt user with battery alert so user can reduce the screen brightness in a mobile phone) may be acceptable for mobile phones (because the thermal envelope and battery in a mobile phone is likely able to support the maximum display brightness) without interrupting user before the application is finished (a few hours, for example). However, AR/VR wearable devices need a different approach to cope with the challenge that the system is always expected to have some service constraints.

In some examples, user habits that have impact to system power (screen brightness, audio volume, typical app run time, etc.) may be used by operating systems to perform admission control on the service performance levels at application launch so that users have a stable user experience throughout a typical running period with minimum interruption. For example, applications' desired running times may be provided to the OS as a key performance hint. This hint may include desired run time and minimum run time, in some examples.

There may be multiple options to generate such hints. In one option, the application may generate anonymized user habit statistics without targeting any specific user. In another option, the application may collect individual user habits with explicit user privacy agreement. In yet another option, the OS may generate statistics on user habits based on application category without targeting any specific user.

Using the hint of application running time, the OS may examine the current system health condition (current skin temperature, battery level, etc.), select the service performance levels based on power/thermal models so that throughout the predicted running period, user experience is consistent and stable. If both the desired run time and the minimum run time are provided, the OS may determine based on the current system health on which one to use.

In the example scenario depicted in diagram 700, the habit information blocks represent examples of possible places where the user's habit information may be collected and how the OS can select the right service levels to ensure user experience consistency with predictive power/thermal modeling. In the example scenario, user habit or expectation of application runtime may be collected in different ways (the user habit information per application 714 and the user habit information per user 716 at the application 710 and the user habit information per application category 724 at the OS 720) When the application is launched, the application may indicate multiple service level choices: high performance service level choice consumes more power, may cause system rising temperature, drain battery faster; low performance service level choice may consume lower power, prolong battery life, and slow temperature rising rate. Current system health (temperature, battery level, and change rates of both) may be reported to the OS service manager, which may include power and thermal models. The OS service manager may predict runtime of service level choices based on the system health. The appropriate service level may be selected and provided to the application to be launched. Based on the application's choice, if the application launches at such service level, user experience may likely be continuous for the statistical runtime without interruption. In the scenario, where the OS generates statistics on user habit based on application category without targeting any specific user, the OS may maintain statistics on the accuracy of the prediction. If the prediction was inaccurate, the OS may learn from the prediction and modify for future sessions.

Figure 8:
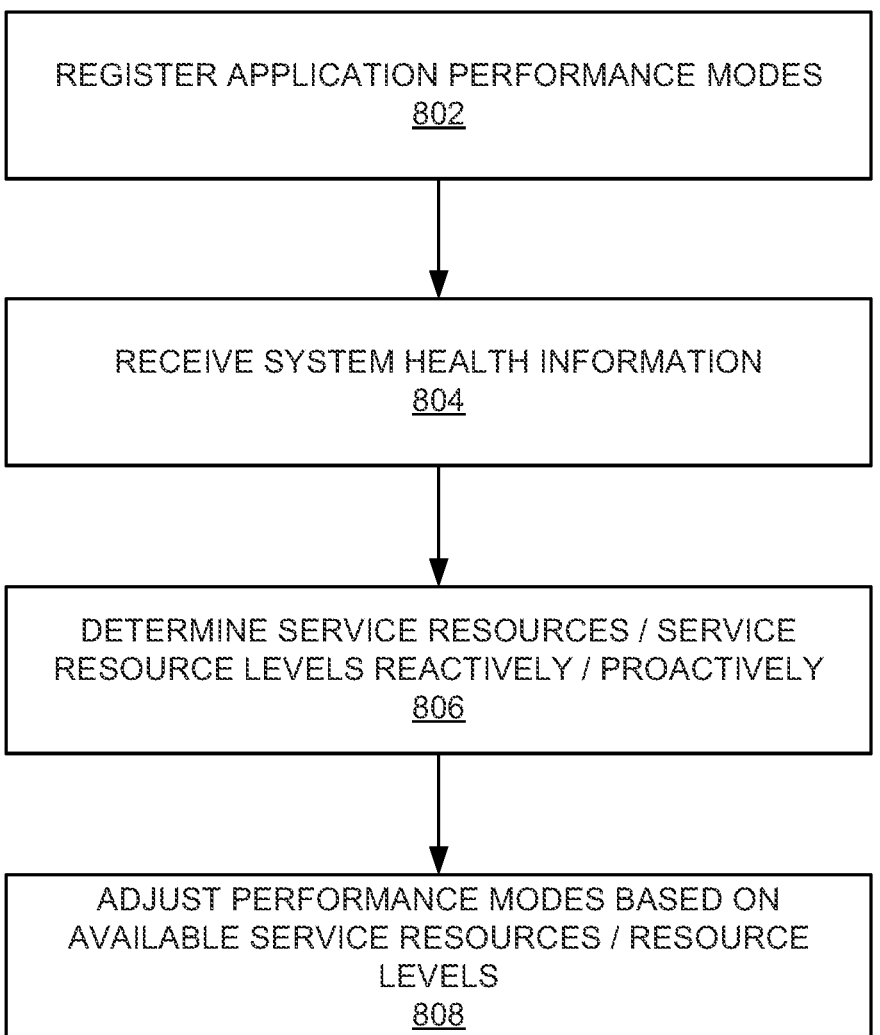
FIG. 8 illustrates a flow diagram for a method of managing service priorities in an AR/VR display device, according to some examples.

FIG. 8 illustrates a flow diagram for a method of managing service priorities in an AR/VR display device, according to some examples. The method 800 is provided by way of example, as there may be a variety of ways to carry out the method described herein. Although the method 800 is primarily described as being performed by the components of FIGS. 4 and 5, the method 800 may be executed or otherwise performed by one or more processing components of another system or a combination of systems. Each block shown in FIG. 8 may further represent one or more processes, methods, or subroutines, and one or more of the blocks (e.g., the selection process) may include machine readable instructions stored on a non-transitory computer readable medium and executed by a processor or other type of processing circuit to perform one or more operations described herein.

At block 802, applications in an AR/VR system such as collaborative applications and immersive applications may register their performance modes as ARBs. For each mode, the applications request specific performance from the underlying hardware/firmware/software subsystems. The performance modes may be determined based on application service priorities, user habits, and shell application relative priorities. These priorities may be provided to an OS service for management, optimization, and/or arbitration of services within the AR/VR system as aggregated service priorities.

At block 804, the OS service for management, optimization, and/or arbitration of services may receive system health information such as available power level (e.g., battery power), temperature, available wireless bandwidth, memory, processing capacity, etc.

At block 806, the OS service for management, optimization, and/or arbitration of services may determine service resources and service resource levels (e.g., how much power is available for a call application's expected duration of a communication exchange). The determination may be reactive (based on changing conditions in real time) or proactive (prediction of service levels using models and statistical information).

At block 808, performance modes may be adjusted based on available resources/resource levels. Thus, an arbitration may be executed across different applications and services by the OS service for management, optimization, and/or arbitration of services, which has a unique visibility into the relative priorities across applications and services for current operation and can determine the activeness or operation state of applications (e.g., determine which apps are in foreground, determine which ones are in the background, etc.). Accordingly, effective graceful degradation may be achieved, where a user receives the highest quality experience possible for as long as possible given their usage scenario and the current system conditions.

According to examples, a method of making an AR/VR system that employs effective graceful degradation through management, optimization, and/or arbitration of services is described herein. A system of making AR/VR system is also described herein. A non-transitory computer-readable storage medium may have an executable stored thereon, which when executed instructs a processor to perform the methods described herein.

In the foregoing description, various examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. An augmented reality/virtual reality (AR/VR) system, comprising:
    a wearable AR/VR device to present AR/VR user experience to a user; and
    a computing device communicatively coupled to the wearable AR/VR device, wherein the system further comprises:

an operating system (OS);

at least one application; and a device health manager (DHM) service executed within the OS, the DHM service to:

receive performance modes from the at least one application;

receive system health information from hardware and software subsystems of the AR/VR system;

determine service resource availability; and arbitrate performance mode adjustments for the at least one application based on the service resource availability.

2. The AR/VR system of claim 1, wherein the performance modes are determined based on at least one of an application service priority, an application relative priority, a user habit per application, a user habit per user, or a user habit per application category.

3. The AR/VR system of claim 2, wherein the user habit per application and the user habit per user are determined by each application, and the user habit per application category is determined at an OS level.

4. The AR/VR system of claim 2, wherein a plurality of application service priorities and a plurality of application relative priorities are provided to the DHM as aggregated service priorities.

5. The AR/VR system of claim 1, wherein the system health information comprises at least one of available power level, temperature, available wireless bandwidth, available memory, or available processing capacity, and the hardware and software subsystems of the AR/VR system comprise graphic interface, audio hardware, computer vision hardware, and other services hardware.

6. The AR/VR system of claim 1, wherein the at least one application is a collaborative application and is managed by the DHM through an application framework and a shell.

7. The AR/VR system of claim 1, wherein the system further comprises an immersive application managed by the DHM.

8. A method, comprising:

registering performance modes from one or more applications executed within an operating system (OS) of an augmented reality/virtual reality (AR/VR) system;

receiving system health information from hardware and software subsystems of the AR/VR system;

determining service resource availability based on the received system health information and the registered performance modes; and arbitrating performance mode adjustments for the one or more applications based on the service resource availability.

9. The method of claim 8, further comprising:

determining the performance modes based on at least one of an application service priority, an application relative priority, a user habit per application, a user habit per user, or a user habit per application category.

10. The method of claim 9, further comprising:

determining the user habit per application by generating anonymized user habit statistics without targeting a specific user.

11. The method of claim 10, further comprising:

determining the user habit per user by collecting individual user habits with explicit user privacy agreement, and determining the user habit per application category by generating statistics on user habit based on application category without targeting a specific user.

12. The method of claim 9, further comprising:

aggregating a plurality of service priorities from the one or more applications at an application layer shell based on at least one of whether an application is a foreground application, whether the application is a background application, a user's attention point, an application augment location, or a distance of the application augment location from the user; and passing the aggregated plurality of service priorities to a device health manager (DHM) service for optimization and arbitration.

13. The method of claim 8, wherein the system health information comprises at least one of available power level, temperature, available wireless bandwidth, available memory, or available processing capacity, and the hardware and software subsystems of the AR/VR system comprise graphic interface, audio hardware, computer vision hardware, and other services hardware.

14. The method of claim 8, wherein a first one of the one or more applications is a collaborative application, and arbitrating the performance mode adjustments comprises:

managing the collaborative application by a DHM through an application framework and a shell.

15. The method of claim 8, wherein a second one of the one or more applications is an immersive application, and arbitrating the performance mode adjustments comprises:

managing the immersive application by a DHM through an AR compositor.

16. A method, comprising:

receiving service requests and service priorities from one or more applications executed within an augmented reality/virtual reality (AR/VR) system, wherein the service priorities are determined based on user experience preferences for the one or more applications;

aggregating the service requests and the service priorities among the one or more applications based on application operation state;

receiving system health information from hardware and software subsystems of the AR/VR system;

determining service adjustments and resources to be distributed to each requested service based on the aggregated service priorities and the received system health information; and arbitrating service adjustments for the one or more applications.

17. The method of claim 16, wherein arbitrating the service adjustments for the one or more applications comprises:

providing the service adjustments to a firmware layer of the AR/VR system.

18. The method of claim 16, wherein the system health information comprises available power budget for a wearable display device of the AR/VR system.

19. The method of claim 18, wherein arbitrating the service adjustments for the one or more applications further comprises:

reducing one or more aspects of a user experience based on the service adjustments.

20. The method of claim 16, wherein aggregating the service requests and the service priorities among the one or more applications based on the application operation state comprises:

determining whether an application is in a foreground or in a background, or whether a user is gazing onto an augment of the application.

* * * * *